United States Patent [19]
Robb

[11] Patent Number: 5,627,674
[45] Date of Patent: May 6, 1997

[54] ULTRAVIOLET LENS SYSTEMS INCLUDING LIQUID LENS ELEMENTS

[75] Inventor: Paul N. Robb, Sunnyvale, Calif.

[73] Assignee: Lockheed Missiles & Space Company, Inc., Sunnyvale, Calif.

[21] Appl. No.: 261,418

[22] Filed: Jun. 17, 1994

[51] Int. Cl.$^6$ .............................. G02B 1/02; G02B 1/06; G02B 13/14; G02B 3/12
[52] U.S. Cl. .................................. 359/355; 359/665
[58] Field of Search ........................ 359/350, 355, 359/665, 666, 667

[56] References Cited

U.S. PATENT DOCUMENTS

| | | | |
|---|---|---|---|
| 4,958,919 | 9/1990 | Sigler | 350/418 |
| 5,020,889 | 6/1991 | Mercado et al. | 350/463 |
| 5,033,831 | 7/1991 | Sigler | 350/418 |

OTHER PUBLICATIONS

"Selection of optical glasses" by Paul N. Robb: 1985 International Lens Design Conference, Jun. 10–23, 1985, a Reprint from the SPIE Proceedings, vol. 554, pp. 60–75.

"Refractive indices of liquids in the ultraviolet and infrared" by Paul Robb, SPIE Proceedings Reprint from Passive Materials for Optical Elements II, Jul. 14–15, 1993, vol. 2018, pp. 200–205.

*Primary Examiner*—Jon W. Henry
*Attorney, Agent, or Firm*—Robert P. Sabath; Edward J. Radlo

[57] ABSTRACT

Lens systems (8, 18, 28, 38, 48, 58) with first and second rigid lens elements and a liquid lens element therebetween are provided. The first and second rigid lens elements (10, 11; 20, 21; 30, 31; 40, 41; 50, 51; 60, 61) and the liquid lens elements (16, 26, 36, 46, 56, 66) co-act with each other to cause the lens system to have substantially diffraction limited performance over a continuous ultraviolet wavelength band, wherein the first and second rigid lens elements and the liquid lens element are configured and positioned with respect to each other according to a selection of particular designs and design forms.

10 Claims, 12 Drawing Sheets

FIG_1
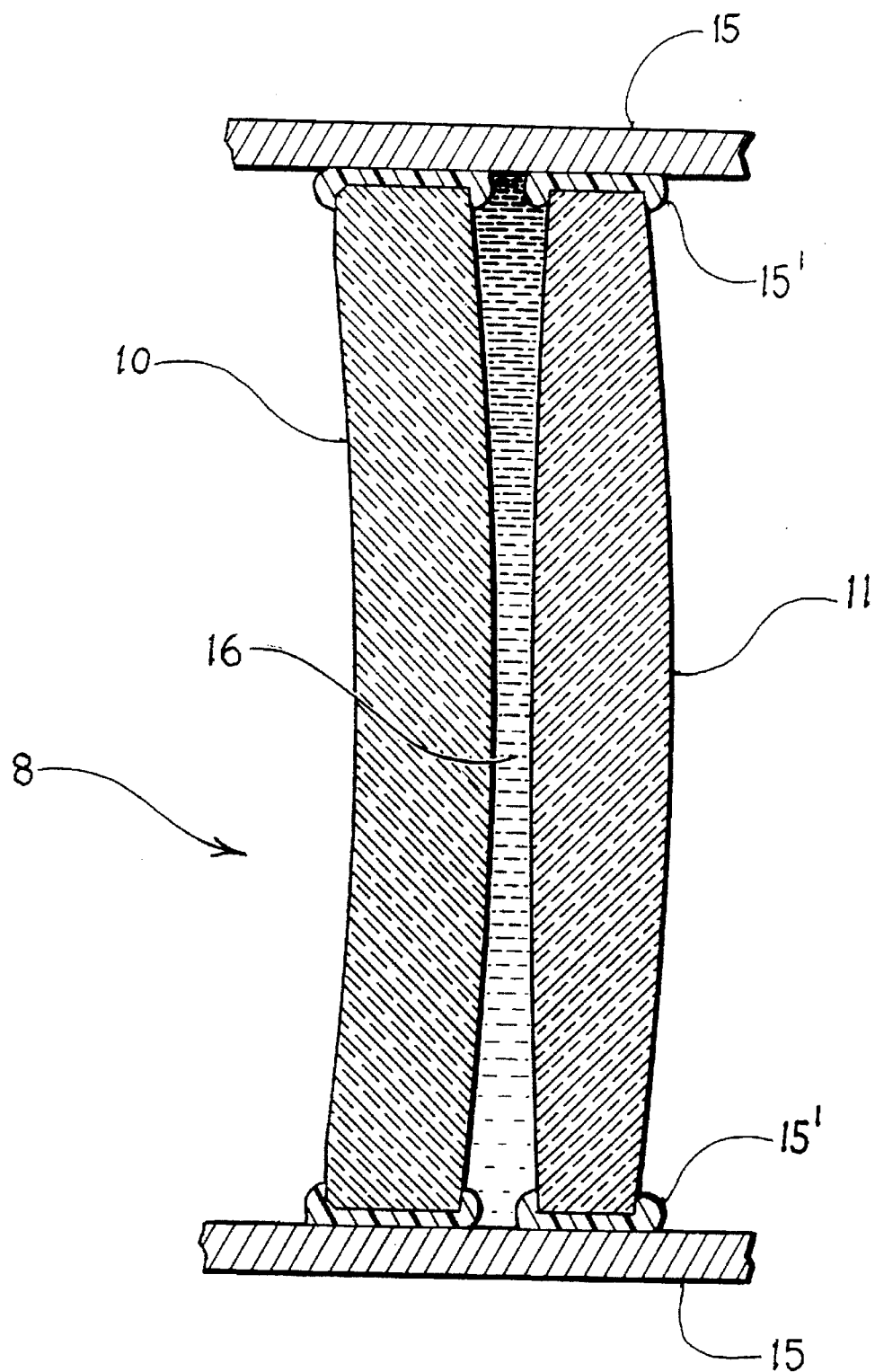

FIG_2
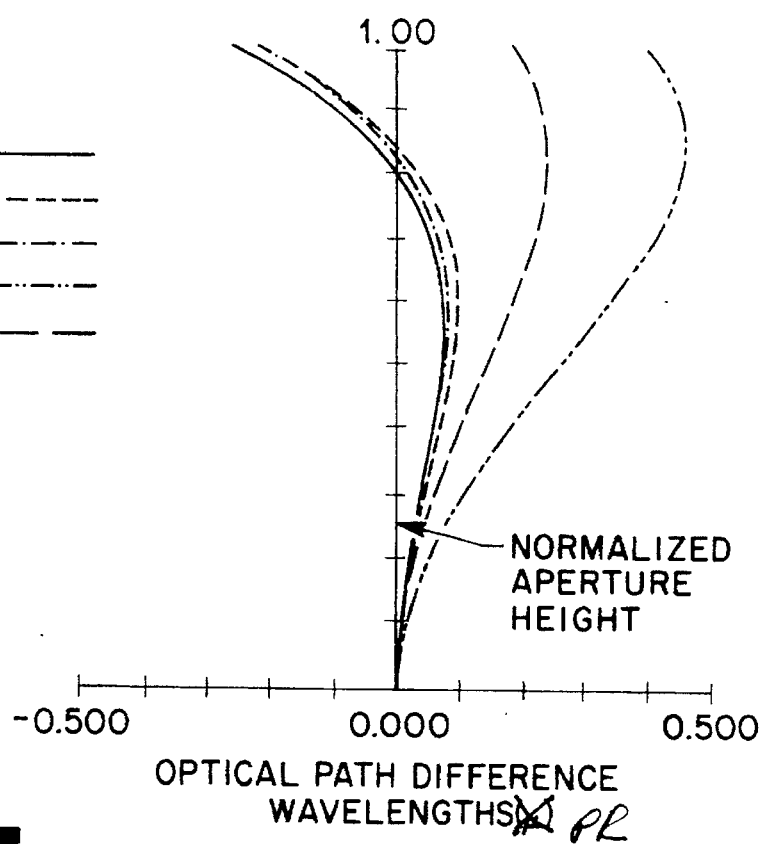
| NO. | λ (MICRONS) |
|---|---|
| | 0.25365 |
| | 0.28045 |
| | 0.29673 |
| | 0.31257 |
| | 0.40466 |
FIG_3
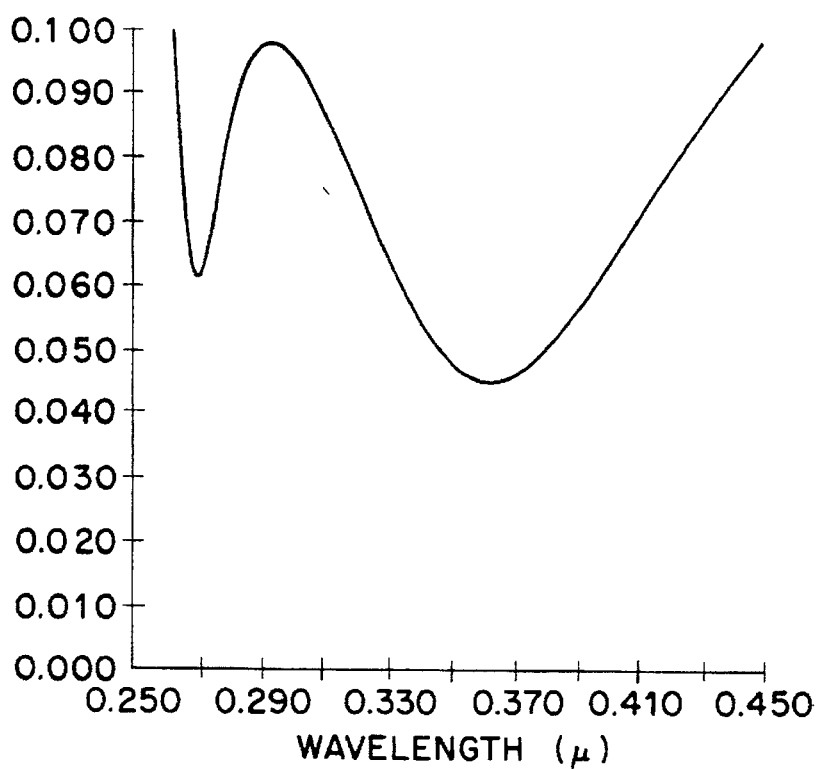

FIG_4
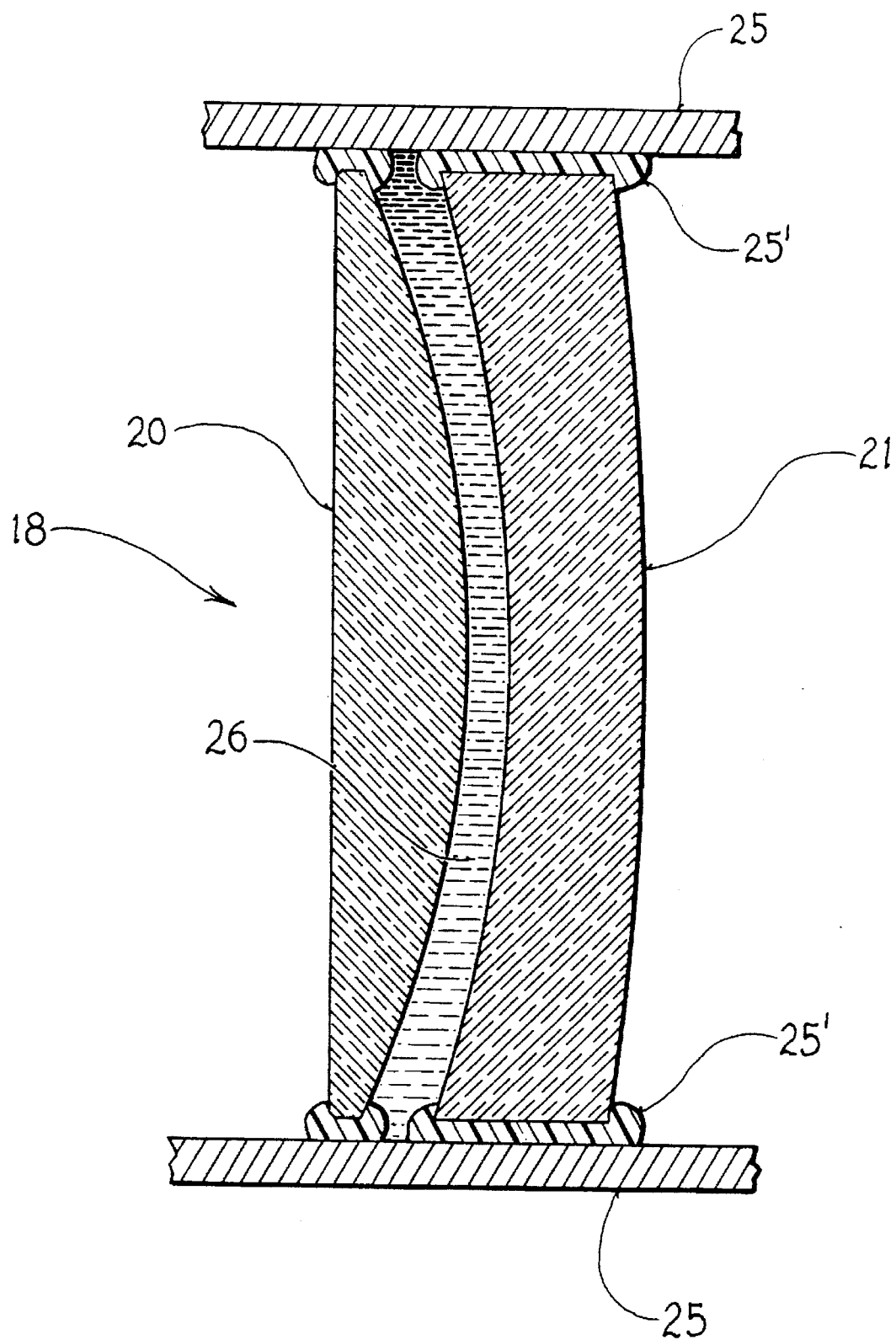

FIG_5
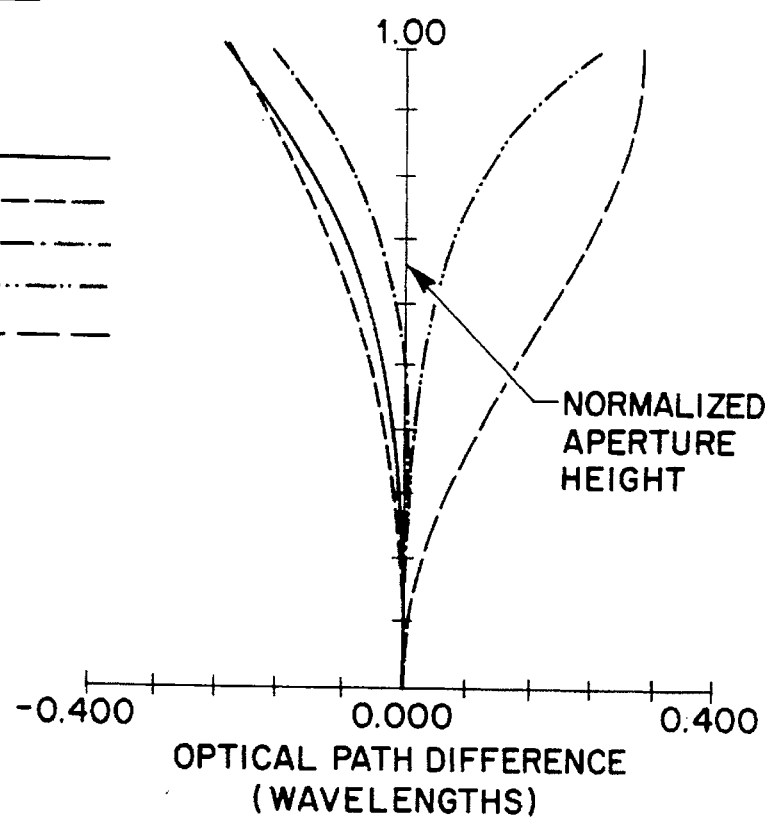
| NO. λ (MICRONS) |
|---|
| 0.25365 ———— |
| 0.28045 ———— |
| 0.29673 —·—·— |
| 0.31257 —··—··— |
| 0.40466 ———— |
FIG_6
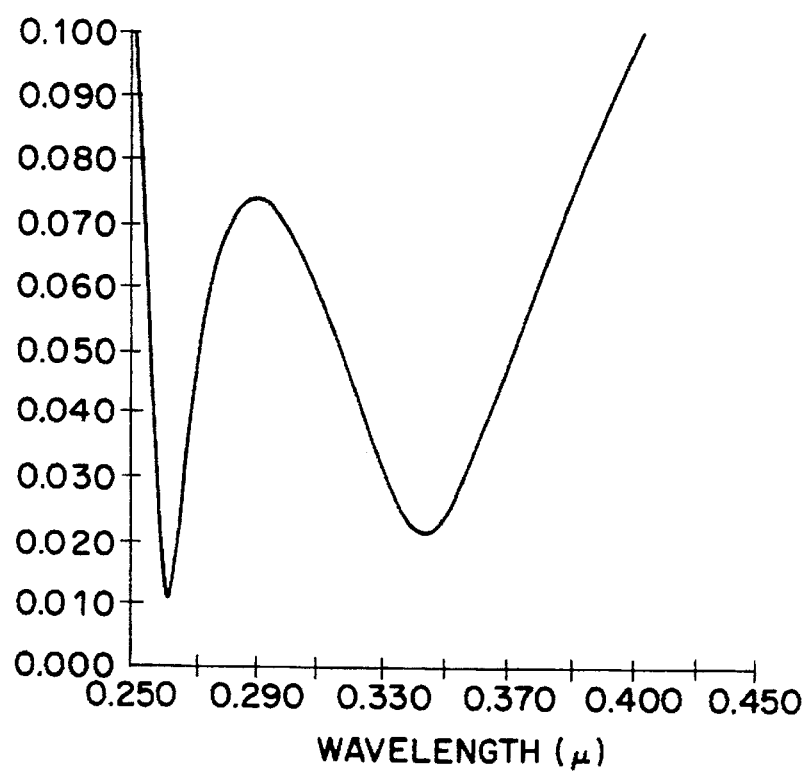

FIG_7
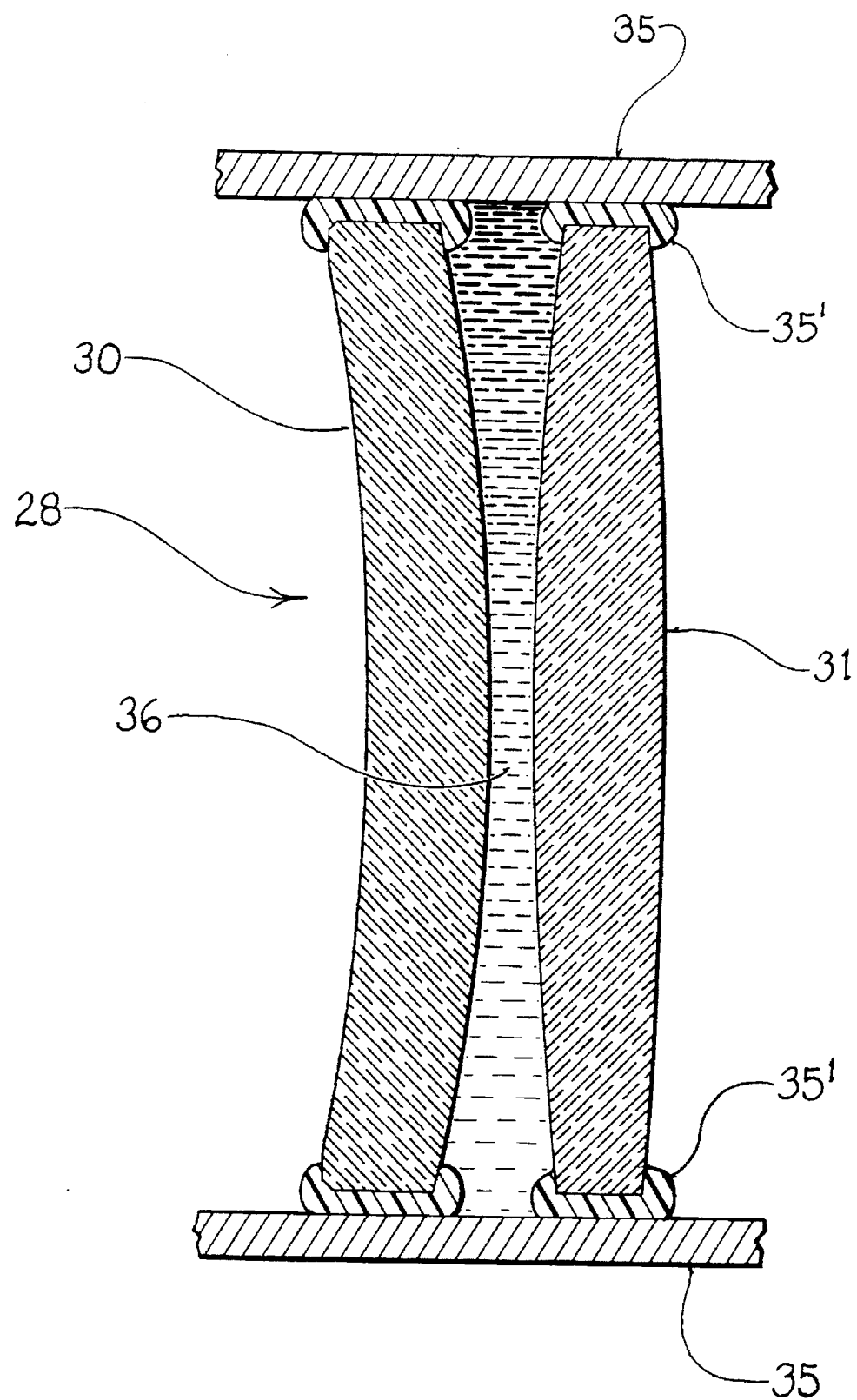

FIG_8
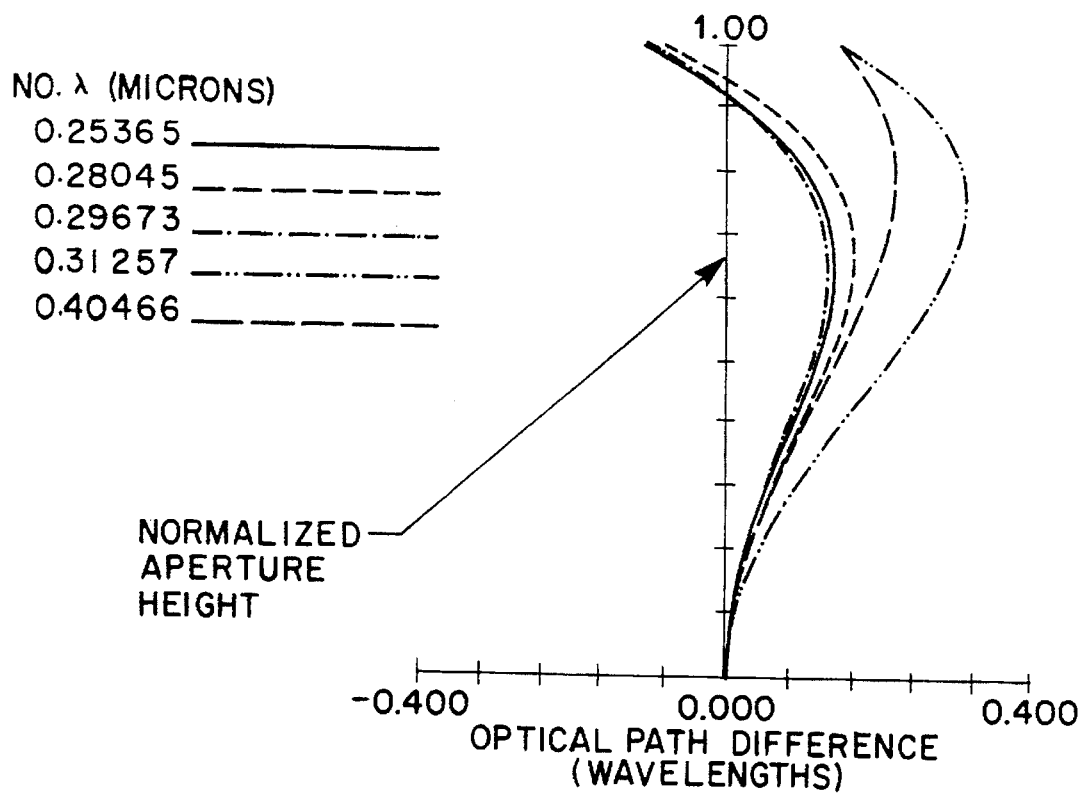
| NO. | λ (MICRONS) |
|---|---|
| | 0.25365 ——————— |
| | 0.28045 — — — — |
| | 0.29673 —··—··— |
| | 0.31257 —···—···— |
| | 0.40466 — — — |
NORMALIZED APERTURE HEIGHT
OPTICAL PATH DIFFERENCE (WAVELENGTHS)
FIG_9
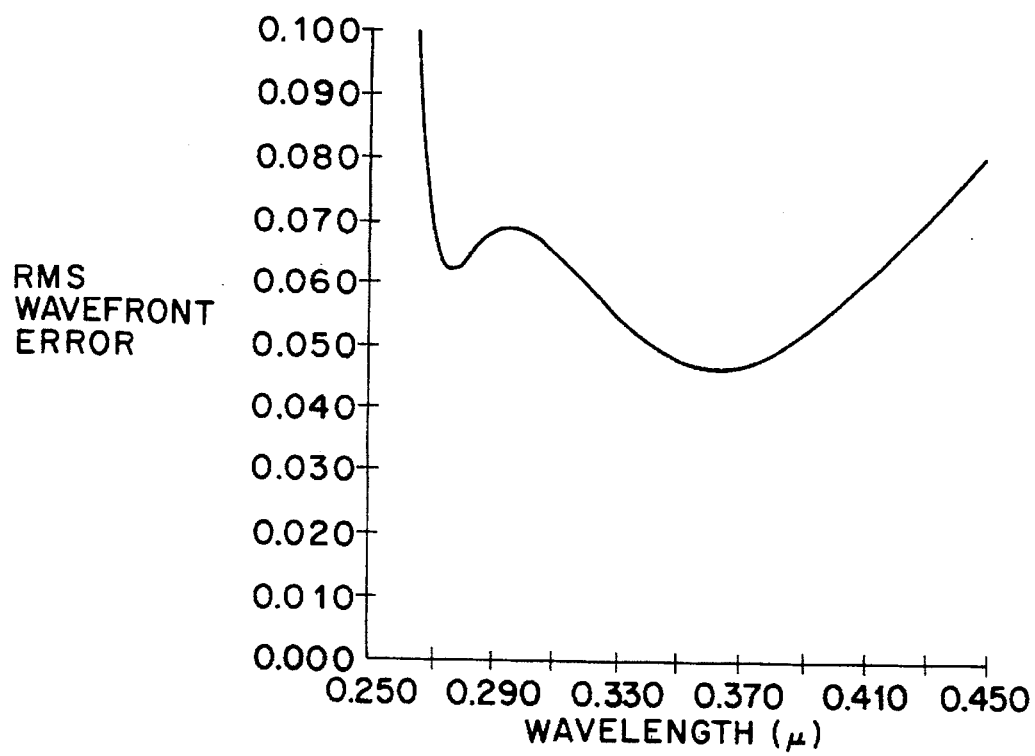
RMS WAVEFRONT ERROR
WAVELENGTH ($\mu$)

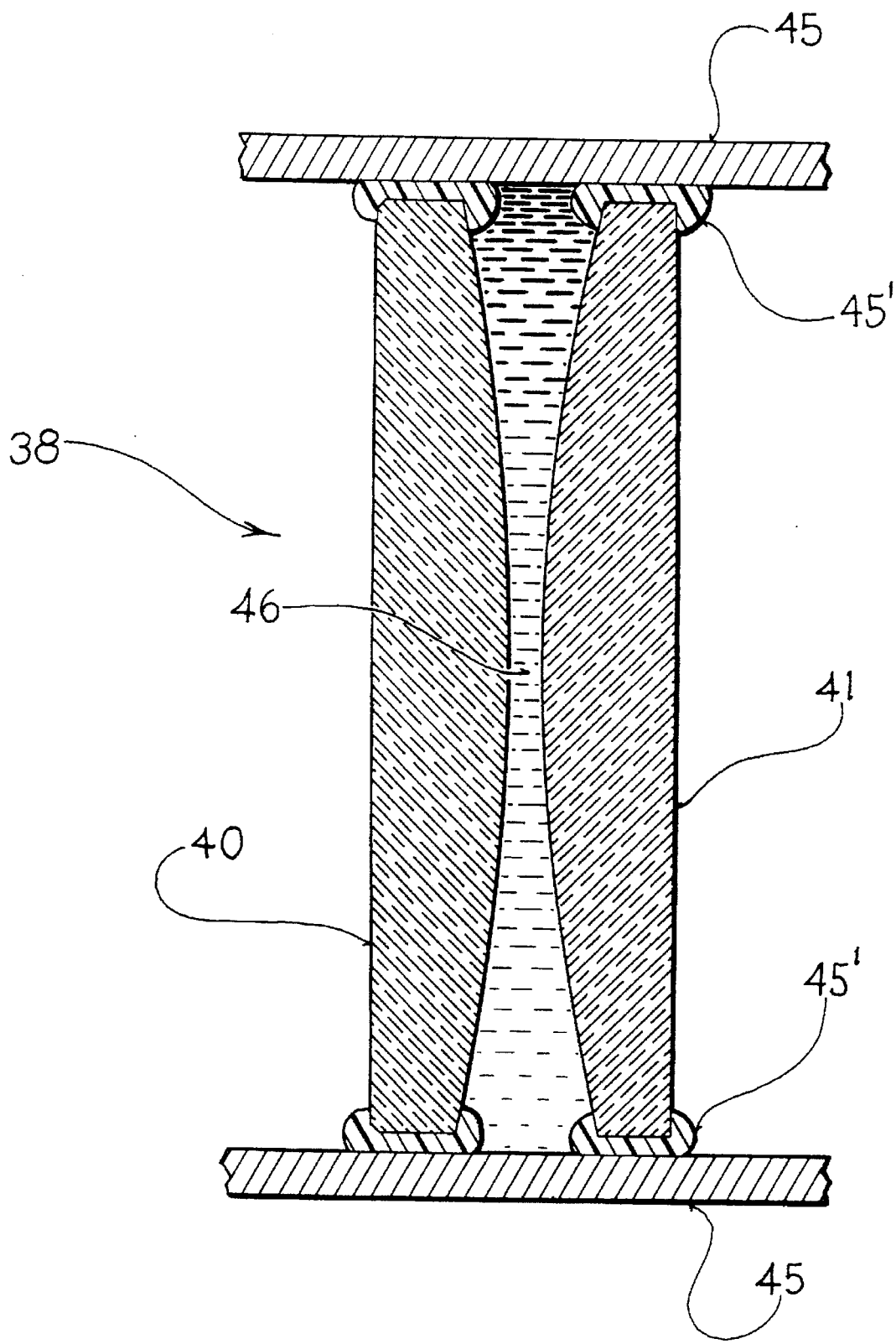
FIG_10

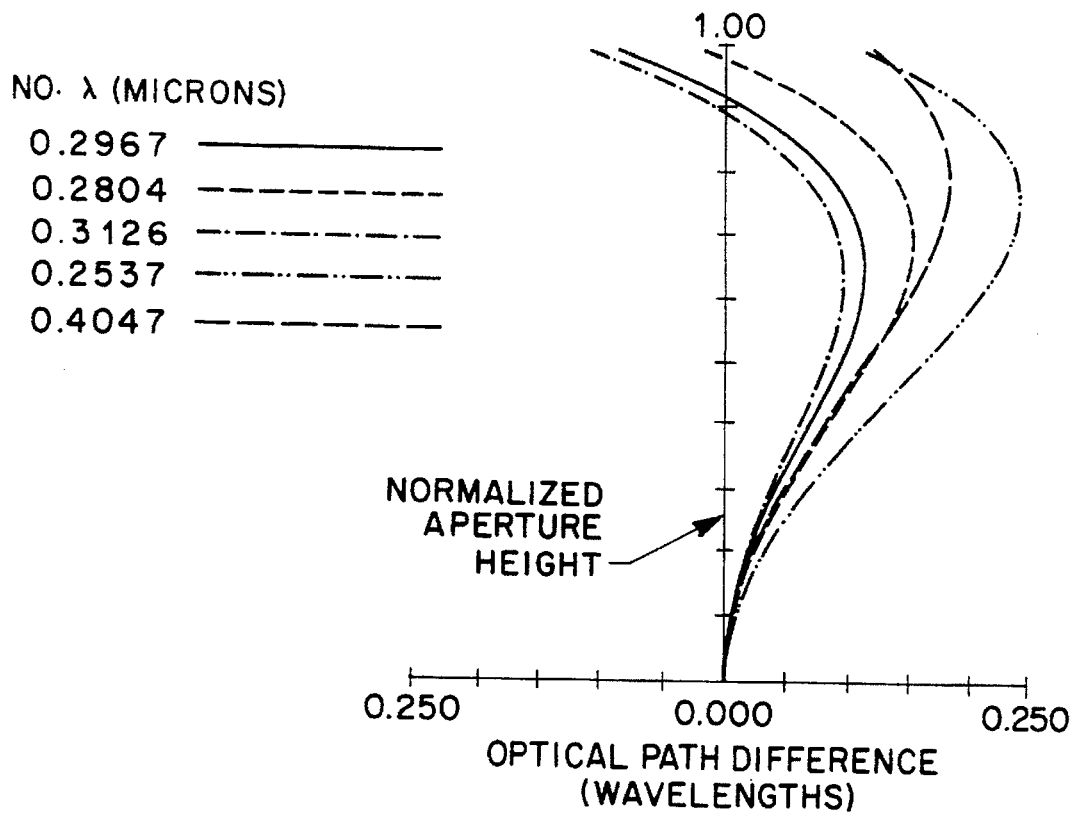
FIG_11
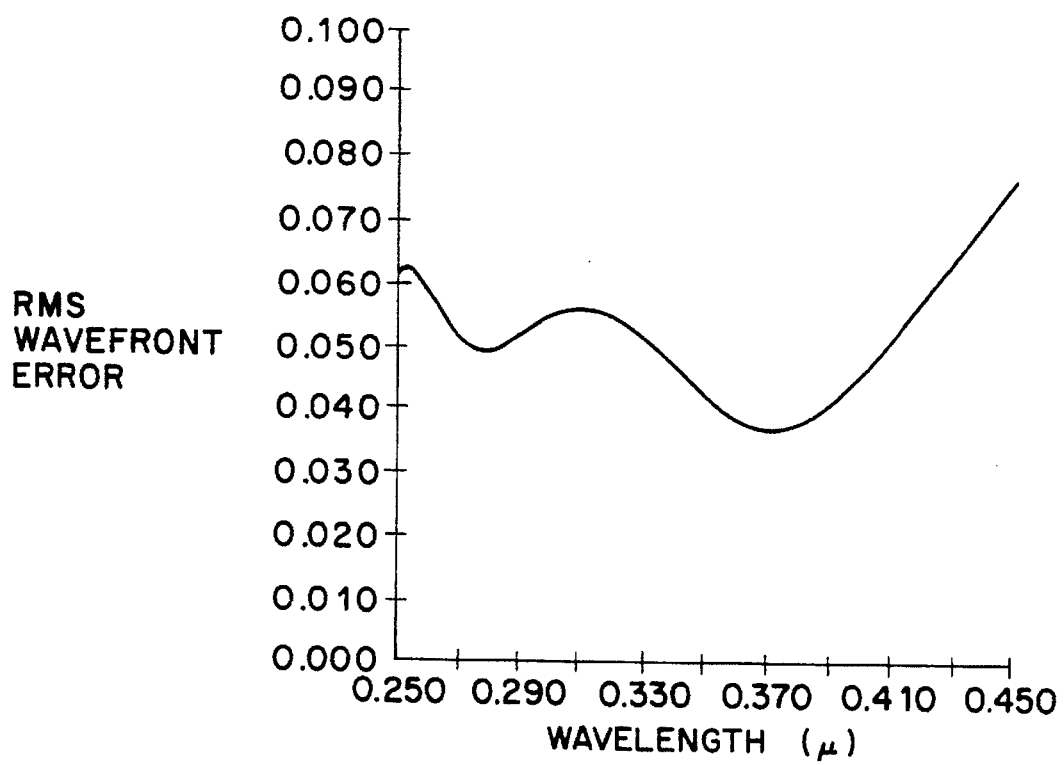
FIG_12

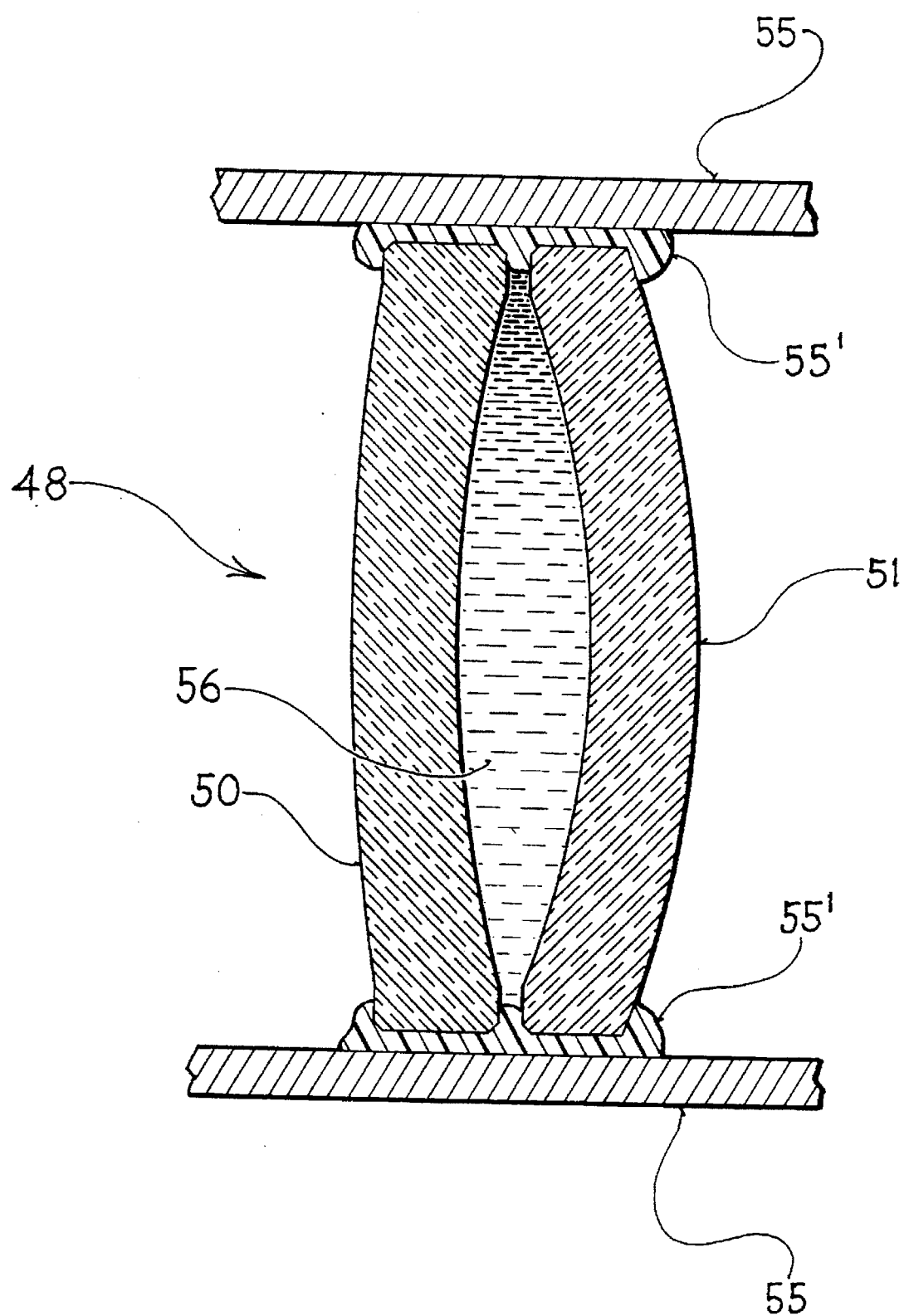
FIG_13

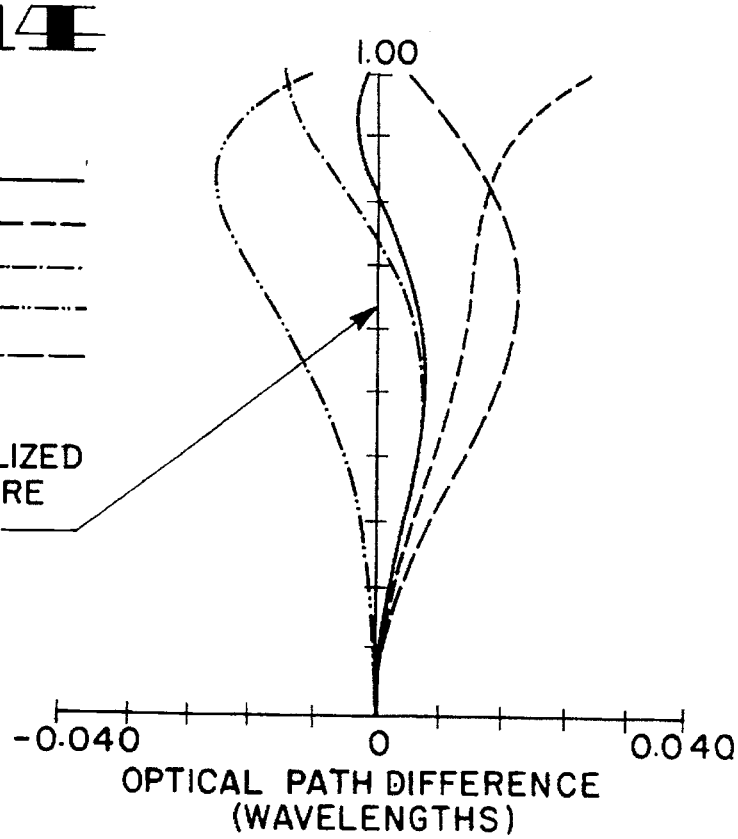
FIG_14
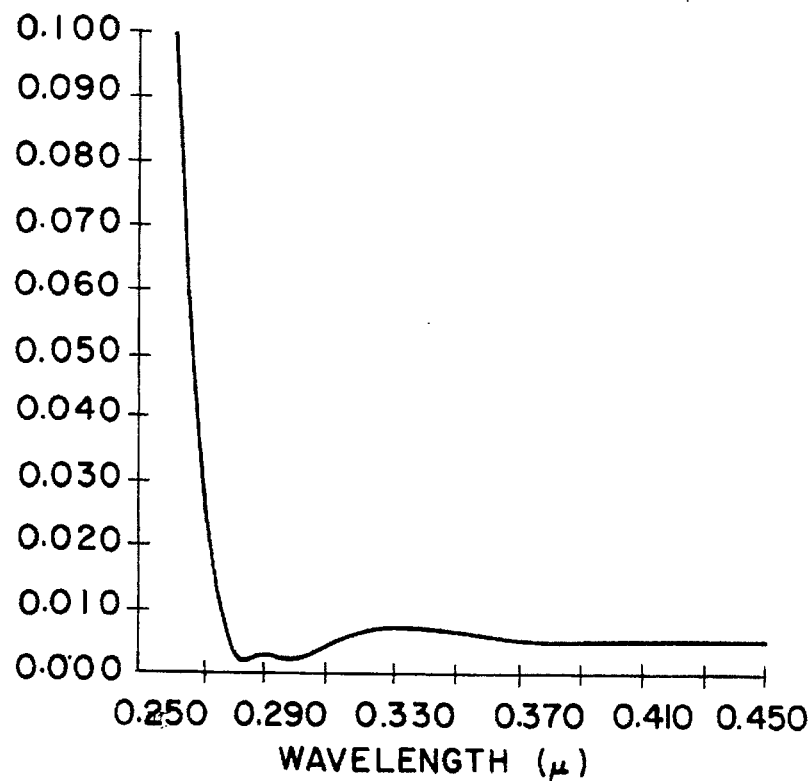
FIG_15

FIG_16
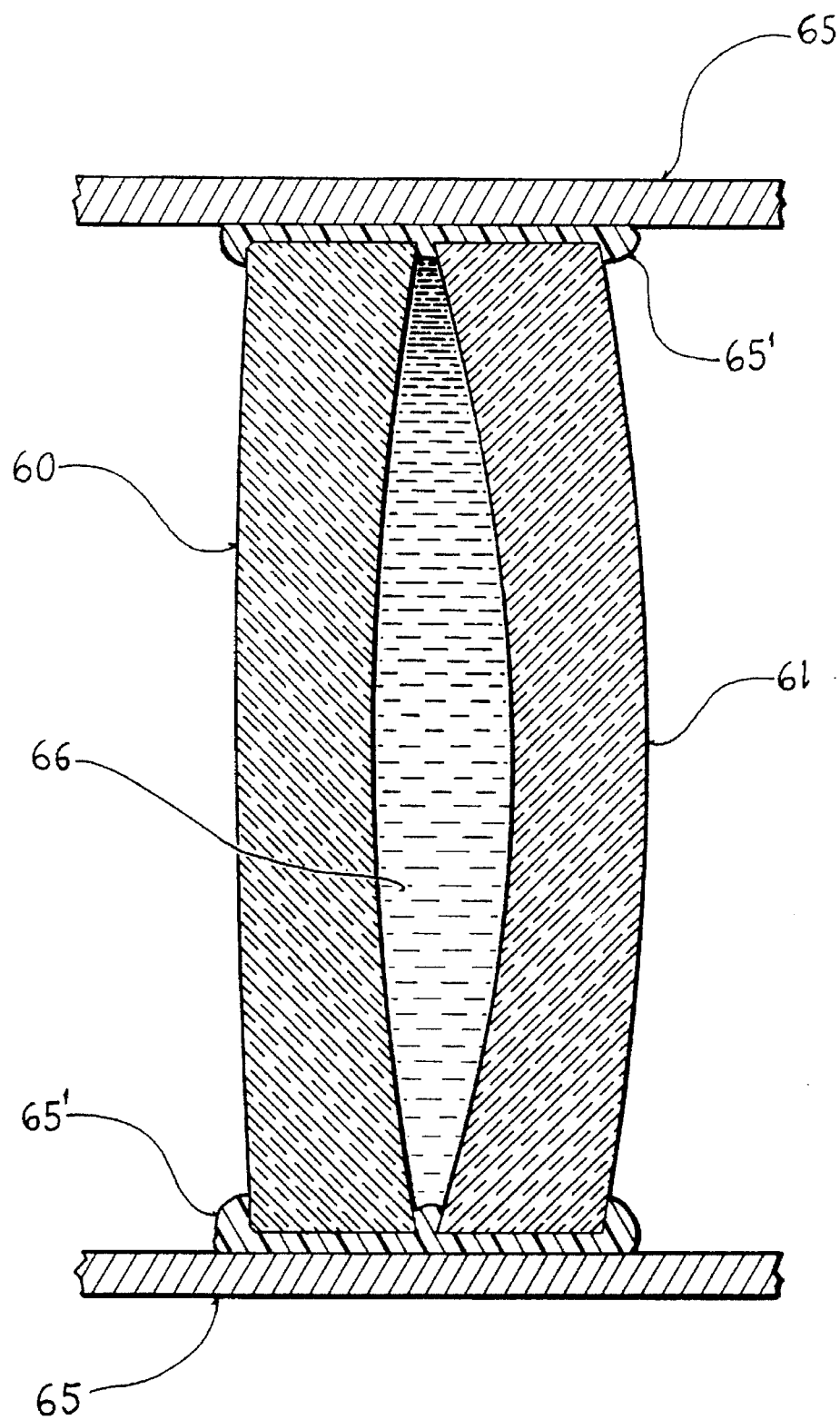

FIG_17
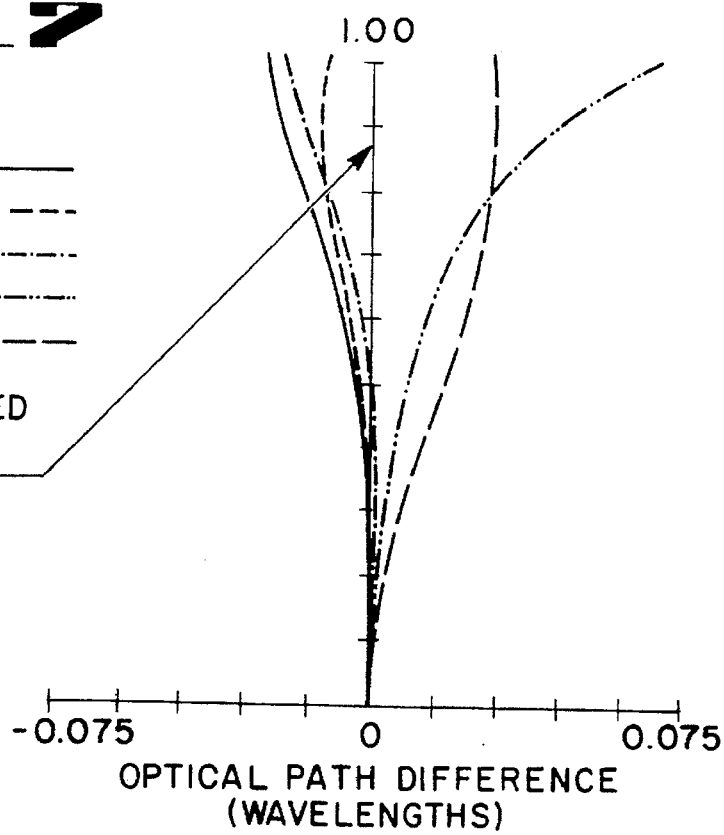
| NO. | λ (MICRONS) |
|---|---|
| | 0.2967 |
| | 0.2804 |
| | 0.3126 |
| | 0.2537 |
| | 0.4047 |
NORMALIZED APERTURE HEIGHT
OPTICAL PATH DIFFERENCE (WAVELENGTHS)
FIG_18
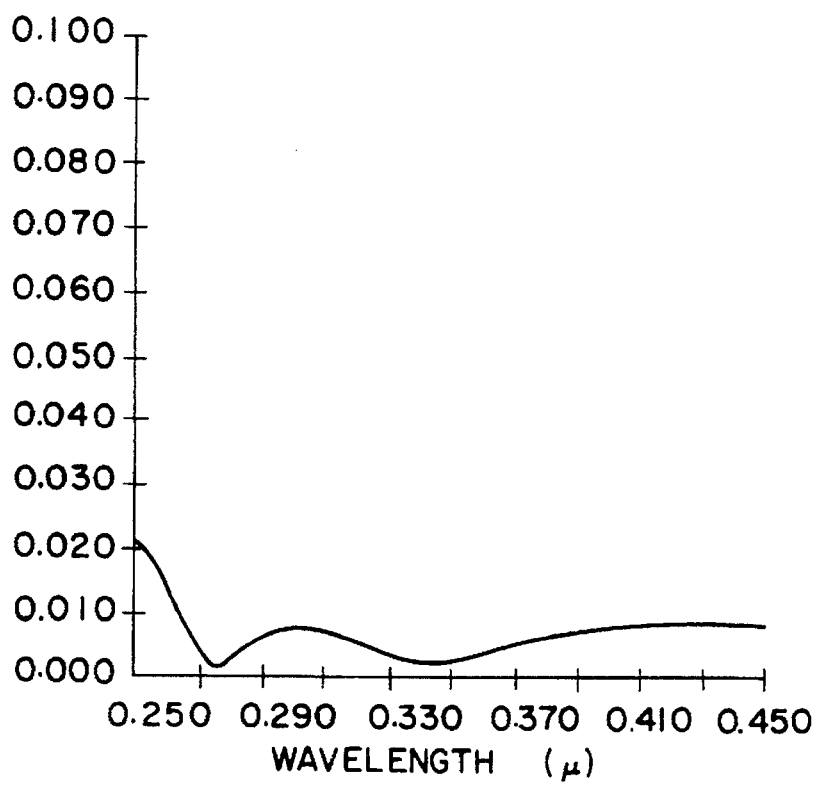
RMS WAVEFRONT ERROR
WAVELENGTH (μ)

ULTRAVIOLET LENS SYSTEMS INCLUDING LIQUID LENS ELEMENTS

TECHNICAL FIELD

This invention relates generally to optical systems that are well-corrected for chromatic aberration, and more particularly to lens systems that exhibit substantially diffraction-limited performance over a continuous wavelength band in the ultraviolet (UV) regions of the electromagnetic spectrum.

BACKGROUND OF THE INVENTION

In order to design an optical system so as to have a specified degree of correction for chromatic aberration, it is necessary to use an appropriate combination of optical materials for the refractive elements of the system. A technique is described in U.S. Pat. No. 5,020,889 for identifying appropriate combinations of optical materials to use in designing optical systems that are to have a specified degree of color correction.

Techniques are described in U.S. Pat. Nos. 4,958,919 and 5,033,831 for selecting combinations of liquids and glasses for use as the lens elements of optical systems that are to be well-corrected for chromatic aberration.

Unless an appropriate combination of optical materials is used for the refractive elements of an optical system, it would not be possible to achieve a specified degree of correction for chromatic aberration for the system. However, the selection of an appropriate combination of optical materials is not a sufficient condition for achieving the specified degree of correction for chromatic aberration. In addition to using an appropriate combination of optical materials, the designer must also determine an appropriate design form for the system—i.e., an appropriate set of geometrical relationships for the refractive elements that comprise the system.

Until recently, techniques as described in the above-cited references for selecting appropriate combinations of optical materials for use in designing optical systems that are corrected for chromatic aberration over specified wavelength ranges had generally not been applied to the design of lens systems incorporating a liquid optical element in the UV wavelength band, because there has been practically a complete absence of refractive index measurements at ultraviolet wavelengths for optically useful liquids.

Recent collaboration between researchers at the Lockheed Palo Alto Research Laboratories in Palo Alto, Calif. and the Vavilov State Optical Institute in St. Petersburg, Russia has resulted in the measurement of refractive indices for a number of liquids at ultraviolet wavelengths. The data obtained thereby has made possible the use of liquids to design optical systems that are well-corrected for chromatic aberration over a broad wavelength band in the ultraviolet region through the visible region into the near infrared region of the electromagnetic spectrum.

SUMMARY OF THE INVENTION

The present invention is directed toward design forms for lens systems (8, 18, 28, 38, 48, 58) which are well-corrected for chromatic aberration as well as for monochromatic aberrations and the chromatic variation of the monochromatic aberrations, and are therefore substantially diffraction-limited over a broad wavelength band extending within the ultraviolet region of the electromagnetic spectrum.

It may be desirable to provide designs and design forms for lens systems (8, 18, 28, 38, 48, 58) that are well-corrected for chromatic aberration and substantially diffraction-limited over a broad wavelength band extending through selected ranges in the ultraviolet region of the electromagnetic spectrum.

It may further be desirable to provide designs and design forms for lens systems using a liquid lens element (16, 26, 36, 46, 56, 66) to achieve correction for chromatic aberration over a broad wavelength band extending through the ultraviolet region of the electromagnetic spectrum. Such lens systems may for example include first and second solid (10, 11; 20, 21; 30, 31; 40 41; 50, 51; 60, 61) lens according to a particular prescription of the invention, which form the sides of a container for a central liquid lens element. The solid lens elements are coaxially disposed along the optical axis, and are mounted so as to constrain the liquid lens element therebetween.

The present invention is disclosed herein in terms of a number of exemplary embodiments of lens systems in which certain liquids, which are available as common chemicals of high purity, usually termed "spectral grade," are used for the liquid lens elements. Mounting of the solid lens elements in order to contain a central fluid lens element under the present invention is accomplished with a flexible inert adhesive material (15', 25', 35', 45', 55', 65') such as fluorosilicone for example. One kind of fluorosilicone material which can be employed is X36141 material from Dow Corning of Midland, Mich. The flexibility of the sealing material permits effective liquid containment under expansion conditions caused by temperature fluctuations without the need for a reservoir. A technique for mounting a pair of solid lens elements so as to contain a liquid lens element therebetween is disclosed in co-pending U.S. patent application Ser. No. 08/014,596 filed on Feb. 8, 1993, now issued as U.S. Pat. No. 5,446,591 on Aug. 29, 1995.

BRIEF DESCRIPTION OF THE DRAWINGS

FIG. 1 shows a profile drawing of a first embodiment of the present invention, which comprises first and second solid lens elements made of sapphire;

FIG. 2 is a plot of the optical path difference versus the normalized aperture height for five selected wavelengths with respect to the embodiment of the invention shown in FIG. 1;

FIG. 3 is a plot of rms wavefront error versus wavelength for a selected ultraviolet wavelength range for the embodiment of the invention shown in FIG. 1;

FIG. 4 shows a profile drawing of a next embodiment of the present invention, which comprises first and second solid lens elements made of fused silica;

FIG. 5 is a plot of the optical path difference versus the normalized aperture height for five selected wavelengths in the case of an embodiment of the invention according to FIG. 4;

FIG. 6 is a plot of rms wavefront error versus wavelength for a selected ultraviolet wavelength range for the embodiment of the invention shown in FIG. 4;

FIG. 7 shows a profile drawing of a next embodiment of the present invention, which comprises first and second solid lens elements made of sapphire;

FIG. 8 is a plot of the optical path difference versus the normalized aperture height for five selected wavelengths in the case of an embodiment of the invention according to FIG. 7;

FIG. 9 is a plot of rms wavefront error versus wavelength for a selected ultraviolet wavelength range for the embodiment of the invention shown in FIG. 8;

FIG. 10 shows a profile drawing of a next embodiment of the present invention, which comprises first and second solid lens elements made of fused silica;

FIG. 11 is a plot of the optical path difference versus the normalized aperture height for five selected wavelengths in the case of an embodiment of the invention according to FIG. 10;

FIG. 12 is a plot of rms wavefront error versus wavelength for a selected ultraviolet wavelength range for the embodiment of the invention shown in FIG. 10;

FIG. 13 shows a profile drawing of a next embodiment of the present invention, which comprises first and second solid lens elements made of sapphire;

FIG. 14 is a plot of the optical path difference versus the normalized aperture height for five selected wavelengths in the case of an embodiment of the invention according to FIG. 13;

FIG. 15 is a plot of rms wavefront error versus wavelength for a selected ultraviolet wavelength range for the embodiment of the invention shown in FIG. 13;

FIG. 16 shows a profile drawing of a next embodiment of the present invention, which comprises first and second solid lens elements made of fused silica;

FIG. 17 is a plot of the optical path difference versus the normalized aperture height for five selected wavelengths in the case of an embodiment of the invention according to FIG. 16; and FIG. 18 is a plot of rms wavefront error versus wavelength for a selected ultraviolet wavelength range for the embodiment of the invention shown in FIG. 16.

DETAILED DESCRIPTION OF THE PREFERRED EMBODIMENTS

First Embodiment

FIG. 1 shows a profile drawing of a first embodiment of the present invention, which comprises a lens arrangement 8 including first and second solid lens elements 10 and 11 respectively, each of which is made of sapphire. The sapphire lens elements 10 and 11 can be obtained from, e.g., Solon Technologies Inc. of Solon, Ohio. Lens arrangement 8 includes a fixture 15 in which are coaxially mounted lens elements 10 and 11 with a flexible material 15', such as fluorosilicone for example, along a common optic axis. Lens arrangement 8 further includes a liquid element 16 contained within fixture 15. The liquid element according to the present embodiment is carbon tetrachloride. According to the United States Mil Spec system for identifying optical materials, carbon tetrachloride is identified by the code designation "459487."

FIG. 2 is a plot of the optical path difference versus the normalized aperture height for five selected wavelengths as indicated by table below, showing that the maximum wavefront error for any one of the plotted wavelengths is less than 0.46 wavelengths for the embodiment of FIG. 1. FIG. 3 is a plot of rms wavefront error for the embodiment of FIG. 1, versus wavelength for an ultraviolet wavelength range from 0.25 to 0.45 microns. As indicated, for the embodiment of FIG. 1, the rms wavefront error is less than 0.098 wave, and the average rms wavefront error is 0.0712 wave, over the range from 0.265 to 0.450 micron.

The lens arrangement shown in FIG. 1 has an optical prescription (i.e., a design form) specified in tabular form as follows:

TABLE 1

| Surface No. | Radius (inches) | Thickness (inches) | $N_d$ | $V_d$ | Material |
|---|---|---|---|---|---|
| 1 | −0.491657 | 0.014161 | 1.768239 | 72.01 | Sapphire |
| 2 | −0.518232 | 0.004889 | 1.459453 | 48.75 | 459487 |
| 3 | 1.639807 | 0.014161 | 1.768239 | 72.01 | Sapphire |
| 4 | −0.447569 | 1.018384 | | | Air | where the surfaces of the lens elements are numbered consecutively from left to right along the optic axis in accordance with optical design convention. Thus, surface No. 1 is the left surface of the first solid lens element. Surface No. 2 is both the right surface of the first solid element and the left surface of the liquid lens element. Surface No. 3 is both the right surface of the liquid lens element and the left surface of the second solid lens element. The aperture stop is at surface No. 1. The radius listed for each lens surface in the table above is the radius of curvature expressed in inches. In accordance with convention, the radius of curvature is positive if the center of curvature of the surface lies to the right of the surface, and negative if the center of curvature of the surface lies to the left of the surface. The thickness listed for each lens surface is the thickness expressed in inches of the lens element bounded on the left by the surface. The thickness of each lens element is measured along the optic axis. The column headed $N_d$ in the table refers to the index of refraction of the lens element bounded on the left by the indicated surface at the wavelength of the sodium d spectral line (i.e., 0.58756 micron). The column headed $V_d$ refers to the Abbe number for the lens element bounded on the left by that surface. The index of refraction of an optical material varies with wavelength. The indices of refraction for the two different materials comprising the solid and liquid lens elements of the lens system indicated, at five representative wavelengths (i.e., $N_1$ at 0.29673 micron, $N_2$ at 0.28045 micron, $N_3$ at 0.31257 micron, $N_4$ at 0.25365 micron, $N_5$ at 0.40466 micron) are tabulated as follows:

TABLE 2

| Material | $N_1$ | $N_2$ | $N_3$ | $N_4$ | $N_5$ |
|---|---|---|---|---|---|
| Sapphire | 1.815969 | 1.824203 | 1.809266 | 1.840217 | 1.785820 |
| $CCl_4$ | 1.507370 | 1.516826 | 1.500054 | 1.538647 | 1.475918 |

The lens system of the embodiment indicated has been evaluated above for each of the above-specified wavelengths. In particular, a graphical indication of performance of the lens system at the particular wavelengths has been provided by a plot of optical path difference as a function of normalized aperture height for the specified wavelength. As shown above, plots of optical path difference as a function of normalized aperture height are shown for the indicated lens system for each of the same five wavelengths for which indices of refraction are tabulated. It can be determined from the curves plotted that the maximum optical path difference for the lens system shown throughout the selected range of wavelengths is less than 0.46 waves at any point on the aperture. Further shown above, the root-mean-square (rms) wavefront error of the lens system shown has been plotted throughout a selected portion of the ultraviolet spectrum. According to the information shown, the lens system is well corrected throughout the selected range of the ultraviolet spectrum.

Second Embodiment

FIG. 4 shows a profile drawing of another embodiment of the present invention, which comprises a lens arrangement 18 including first and second solid lens elements 20 and 21 respectively, each of which is made of fused silica. The fused silica lens elements can be obtained from, e.g., Heraeus Amersil, Inc. of Duluth, Ga. Lens arrangement 18 includes a fixture 25 in which are coaxially mounted lens elements 20 and 21 with a flexible material 25', such as fluorosilicone for example, along a common optic axis. Lens arrangement 18 further includes a liquid element 26 contained within fixture 25. The liquid element according to the present embodiment is carbon tetrachloride. According to the United States Mil Spec system for identifying optical mateddais, carbon tetrachloride is identified by the code designation "459487."

FIG. 5 is a plot of the optical path difference versus the normalized aperture height for five selected wavelengths, showing that the maximum wavefront error for any one of the plotted wavelengths is less than 0.30 wavelengths for the embodiment of FIG. 4. FIG. 6 is a plot of rms wavefront error for the embodiment of FIG. 4, versus wavelength for an ultraviolet wavelength range from 0.25 to 0.45 micron. As indicated, for the embodiment of FIG. 4, the rms wavefront error is less than 0.133 wave, and the average rms wavefront error is 0.0673 wave, over the range from 0.250 to 0.450 micron.

The lens arrangement shown in FIG. 4 has an optical prescription (i.e., a design form) specified in tabular form as follows:

TABLE 3

| Surface No. | Radius (inches) | Thickness (inches) | $N_d$ | $V_d$ | Material |
|---|---|---|---|---|---|
| 1 | −17.260861 | 0.014335 | 1.458464 | 67.82 | Fused Silica |
| 2 | −0.120206 | 0.004854 | 1.459453 | 48.75 | 459487 |
| 3 | −0.173948 | 0.014335 | 1.458464 | 67.82 | Fused Silica |
| 4 | −0.454856 | 1.002262 | | | Air | where the surfaces of the lens elements are numbered consecutively from left to right along the optic axis in accordance with optical design convention. Thus, surface No. 1 is the left surface of the first solid lens element. Surface No. 2 is both the right surface of the first solid element and the left surface of the liquid lens element. Surface No. 3 is both the right surface of the liquid lens element and the left surface of the second solid lens element. The aperture stop is at surface No. 1. The radius listed for each lens surface in the table above is the radius of curvature expressed in inches. In accordance with convention, the radius of curvature is positive if the center of curvature of the surface lies to the right of the surface, and negative if the center of curvature of the surface lies to the left of the surface. The thickness listed for each lens surface is the thickness expressed in inches of the lens element bounded on the left by the surface. The thickness of each lens element is measured along the optic axis. The column headed $N_d$ in the table refers to the index of refraction of the lens element bounded on the left by the indicated surface at the wavelength of the sodium d spectral line (i.e., 0.58756 micron). The column headed $V_d$ refers to the Abbe number for the lens element bounded on the left by that surface. The index of refraction of an optical material varies with wavelength. The indices of refraction for the two different materials comprising the solid and liquid lens elements of the lens system indicated, at five representative wavelengths (i.e., $N_1$ at 0.29673 micron, $N_2$ at 0.28045 micron, $N_3$ at 0.31257 micron, $N_4$ at 0.25365 micron, $N_5$ at 0.40466 micron) are tabulated as follows:

TABLE 4

| Material | $N_1$ | $N_2$ | $N_3$ | $N_4$ | $N_5$ |
|---|---|---|---|---|---|
| Fused Silica | 1.488733 | 1.494039 | 1.484489 | 1.505514 | 1.469616 |
| $CCl_4$ | 1.507370 | 1.516826 | 1.500054 | 1.538647 | 1.475918 |

The lens system of the embodiment indicated has been evaluated above for each of the above-specified wavelengths. In particular, a graphical indication of performance of the lens system at the particular wavelengths has been provided by a plot of optical path difference as a function of normalized aperture height for the specified wavelength. As shown above, plots of optical path difference as a function of normalized aperture height are shown for the indicated lens system for each of the same five wavelengths for which indices of refraction are tabulated. It can be determined from the curves plotted that the maximum optical path difference for the lens system shown throughout the selected range of wavelengths is less than 0.30 waves at any point on the aperture. Further shown above, the root-mean-square (rms) wavefront error of the lens system shown has been plotted throughout a selected portion of the ultraviolet spectrum. According to the information shown, the lens system is well corrected throughout the selected range of the ultraviolet spectrum.

Third Embodiment

FIG. 7 shows a profile drawing of another embodiment of the present invention, which comprises a lens arrangement 28 including first and second solid lens elements 30 and 31 respectively, each of which is made of sapphire. The sapphire lens elements 30 and 31 can be obtained from, e.g., Solon Technologies Inc. of Solon, Ohio. Lens arrangement 28 includes a fixture 35 in which are coaxially mounted lens elements 30 and 31 with a flexible material 35', such as fluorosilicone for example, along a common optic axis. Lens arrangement 8 further includes a liquid element 36 contained within fixture 35. The liquid element according to the present embodiment is hexane. According to the United States Mil Spec system for identifying optical materials, hexane is identified by the code designation "375580."

FIG. 8 is a plot of the optical path difference versus the normalized aperture height for five selected wavelengths, showing that the maximum wavefront error for any one of the plotted wavelengths is less than 0.31 wavelengths for the embodiment of FIG. 7. FIG. 9 is a plot of rms wavefront error for the embodiment of FIG. 7, versus wavelength for an ultraviolet wavelength range from 0.25 to 0.45 microns. As indicated, for the embodiment of FIG. 7, the rms wavefront error is less than 0.111 wave, and the average rms wavefront error is 0.062 wave, over the range from 0.265 to 0.450 micron.

The lens arrangement shown in FIG. 7 has an optical prescription (i.e., a design form) specified in tabular form as follows:

TABLE 5

| Surface No. | Radius (inches) | Thickness (inches) | $N_d$ | $V_d$ | Material |
|---|---|---|---|---|---|
| 1 | −0.322243 | 0.014136 | 1.768239 | 72.01 | Sapphire |
| 2 | −0.247875 | 0.004881 | 1.375217 | 58.03 | 375580 |

TABLE 5-continued

| Surface No. | Radius (inches) | Thickness (inches) | $N_d$ | $V_d$ | Material |
|---|---|---|---|---|---|
| 3 | 0.444671 | 0.014136 | 1.768239 | 72.01 | Sapphire |
| 4 | −0.917975 | 1.015422 | | | Air | where the surfaces of the lens elements are numbered consecutively from left to right along the optic axis in accordance with optical design convention. Thus, surface No. 1 is the left surface of the first solid lens element. Surface No. 2 is both the right surface of the first solid element and the left surface of the liquid lens element. Surface No. 3 is both the right surface of the liquid lens element and the left surface of the second solid lens element. The aperture stop is at surface No. 1. The radius listed for each lens surface in the table above is the radius of curvature expressed in inches. In accordance with convention, the radius of curvature is positive if the center of curvature of the surface lies to the right of the surface, and negative if the center of curvature of the surface lies to the left of the surface. The thickness listed for each lens surface is the thickness expressed in inches of the lens element bounded on the left by the surface. The thickness of each lens element is measured along the optic axis. The column headed $N_d$ in the table refers to the index of refraction of the lens element bounded on the left by the indicated surface at the wavelength of the sodium d spectral line (i.e., 0.58756 micron). The column headed $V_d$ refers to the Abbe number for the lens element bounded on the left by that surface. The index of refraction of an optical material varies with wavelength. The indices of refraction for the two different materials comprising the solid and liquid lens elements of the lens system indicated, at five representative wavelengths (i.e., $N_1$ at 0.29673 micron, $N_2$ at 0.28045 micron, $N_3$ at 0.31257 micron, $N_4$ at 0.25365 micron, $N_5$ at 0.40466 micron) are tabulated as follows:

TABLE 6

| Material | $N_1$ | $N_2$ | $N_3$ | $N_4$ | $N_5$ |
|---|---|---|---|---|---|
| Sapphire | 1.815969 | 1.824203 | 1.809266 | 1.840217 | 1.785820 |
| Hexane | 1.406854 | 1.412716 | 1.402200 | 1.425357 | 1.386373 |

The lens system of the embodiment indicated has been evaluated above for each of the above-specified wavelengths. In particular, a graphical indication of performance of the lens system at the particular wavelengths has been provided by a plot of optical path difference as a function of normalized aperture height for the specified wavelength. As shown above, plots of optical path difference as a function of normalized aperture height are shown for the indicated lens system for each of the same five wavelengths for which indices of refraction are tabulated. It can be determined from the curves plotted that the maximum optical path difference for the lens system shown throughout the selected range of wavelengths is less than 0.31 waves at any point on the aperture. Further shown above, the root-mean-square (rms) wavefront error of the lens system shown has been plotted throughout a selected portion of the ultraviolet spectrum. According to the information shown, the lens system is well corrected throughout the selected range of the ultraviolet.

Fourth Embodiment

FIG. 10 shows a profile drawing of another embodiment of the present invention, which comprises a lens arrangement 38 including first and second solid lens elements 40 and 41 respectively, each of which is made of fused silica. The fused silica lens elements can be obtained from, e.g., Heraeus Amersil, Inc. of Duluth, Ga. Lens arrangement 38 includes a fixture 25 in which are coaxially mounted lens elements 40 and 41, with a flexible material 45' such as fluorosilicone for example, along a common optic axis. Lens arrangement 38 further includes a liquid element 46 contained within fixture 45. The liquid element according to the present embodiment is hexane. According to the United States Mil Spec system for identifying optical materials, hexane is identified by the code designation "375580."

FIG. 11 is a plot of the optical path difference versus the normalized aperture height for five selected wavelengths, showing that the maximum wavefront error for any one of the plotted wavelengths is less than 0.23 wavelengths for the embodiment of FIG. 10. FIG. 12 is a plot of rms wavefront error for the embodiment of FIG. 10, versus wavelength for an ultraviolet wavelength range from 0.25 to 0.45 microns. As indicated, for the embodiment of FIG. 4, the rms wavefront error is less than 0.077 wave, and the average rms wavefront error is 0.052 wave, over the range from 0.250 to 0.450 micron.

The lens arrangement shown in FIG. 10 has an optical prescription (i.e., a design form) specified in tabular form as follows:

TABLE 7

| Surface No. | Radius (inches) | Thickness (inches) | $N_d$ | $V_d$ | Material |
|---|---|---|---|---|---|
| 1 | 1.990923 | 0.014317 | 1.458464 | 67.82 | Fused Silica |
| 2 | −0.282854 | 0.004848 | 1.375217 | 58.03 | 375580 |
| 3 | 0.224832 | 0.014317 | 1.458464 | 67.82 | Fused Silica |
| 4 | −4.677900 | 0.982100 | | | Air | where the surfaces of the lens elements are numbered consecutively from left to right along the optic axis in accordance with optical design convention. Thus, surface No. 1 is the left surface of the first solid lens element. Surface No. 2 is both the right surface of the first solid element and the left surface of the liquid lens element. Surface No. 3 is both the right surface of the liquid lens element and the left surface of the second solid lens element. The aperture stop is at surface No. 1. The radius listed for each lens surface in the table above is the radius of curvature expressed in inches. In accordance with convention, the radius of curvature is positive if the center of curvature of the surface lies to the right of the surface, and negative if the center of curvature of the surface lies to the left of the surface. The thickness listed for each lens surface is the thickness expressed in inches of the lens element bounded on the left by the surface. The thickness of each lens element is measured along the optic axis. The column headed $N_d$ in the table refers to the index of refraction of the lens element bounded on the left by the indicated surface at the wavelength of the sodium d spectral line (i.e., 0.58756 micron). The column headed $V_d$ refers to the Abbe number for the lens element bounded on the left by that surface. The index of refraction of an optical material varies with wavelength. The indices of refraction for the two different materials comprising the solid and liquid lens elements of the lens system indicated, at five representative wavelengths (i.e., $N_1$ at 0.29673 micron, $N_2$ at 0.28045 micron, $N_3$ at 0.31257 micron, $N_4$ at 0.25365 micron, $N_5$ at 0.40466 micron) are tabulated as follows:

TABLE 8

| Material | $N_1$ | $N_2$ | $N_3$ | $N_4$ | $N_5$ |
| --- | --- | --- | --- | --- | --- |
| Fused Silica | 1.488733 | 1.494039 | 1.484489 | 1.505514 | 1.469616 |
| Hexane | 1.406854 | 1.412716 | 1.402200 | 1.425357 | 1.386373 |

The lens system of the embodiment indicated has been evaluated above for each of the above-specified wavelengths. In particular, a graphical indication of performance of the lens system at the particular wavelengths as been provided by a plot of optical path difference as a function of normalized aperture height for the specified wavelength. As shown above, plots of optical path difference as a function of normalized aperture height are shown for the indicated lens system for each of the same five wavelengths for which indices of refraction are tabulated. It can be determined from the curves plotted that the maximum optical path difference for the lens system shown throughout the selected range of wavelengths is less than 0.23 waves at any point on the aperture. Further shown above, the root-mean-square (rms) wavefront error of the lens system shown has been plotted throughout a selected portion of the ultraviolet spectrum. According to the information shown, the lens system is well corrected throughout the selected range of the ultraviolet spectrum.

Fifth Embodiment

FIG. 13 shows a profile drawing of another embodiment of the present invention, which comprises a lens arrangement 48 including first and second solid lens elements 50 and 51 respectively, each of which is made of sapphire. The sapphire lens elements 50 and 51 can be obtained from, e.g., Solon Technologies Inc. of Solon, Ohio. Lens arrangement 48 includes a fixture 55 in which are coaxially mounted lens elements 50 and 51 with a flexible material 55', such as fluorosilicone for example, along a common optic axis. Lens arrangement 48 further includes a liquid element 56 contained within fixture 55. The liquid element according to the present embodiment is perfluoromethyldecalin. Perfluoromethyldecalin is identified by the code designation "312.02."

FIG. 14 is a plot of the optical path difference versus the normalized aperture height for five selected wavelengths, showing that the maximum wavefront error for any one of the plotted wavelengths is less than 0.027 wavelengths for the embodiment of FIG. 13. FIG. 15 is a plot of rms wavefront error for the embodiment of FIG. 13, versus wavelength for an ultraviolet wavelength range from 0.25 to 0.45 microns. As indicated, for the embodiment of FIG. 13, the rms wavefront error is less than 0.113 wave, and the average rms wavefront error is 0.0099 wave, over the range from 0.260 to 0.450 micron.

The lens arrangement shown in FIG. 13 has an optical prescription (i.e., a design form) specified in tabular form as follows:

TABLE 9

| Surface No. | Radius (inches) | Thickness (inches) | $N_d$ | $V_d$ | Material |
| --- | --- | --- | --- | --- | --- |
| 1 | 0.446790 | 0.014162 | 1.768239 | 72.01 | Sapphire |
| 2 | 0.193834 | 0.017500 | 1.317242 | 102.26 | 312.02 |
| 3 | −0.129698 | 0.014162 | 1.768239 | 72.01 | Sapphire |
| 4 | −0.156752 | 1.027437 | | | Air | where the surfaces of the lens elements are numbered consecutively from left to right along the optic axis in accordance with optical design convention. Thus, surface No. 1 is the left surface of the first solid lens element. Surface No. 2 is both the right surface of the first solid element and the left surface of the liquid lens element. Surface No. 3 is both the right surface of the liquid lens element and the left surface of the second solid lens element. The aperture stop is at surface No. 1. The radius listed for each lens surface in the table above is the radius of curvature expressed in inches. In accordance with convention, the radius of curvature is positive if the center of curvature of the surface lies to the right of the surface, and negative if the center of curvature of the surface lies to the left of the surface. The thickness listed for each lens surface is the thickness expressed in inches of the lens element bounded on the left by the surface. The thickness of each lens element is measured along the optic axis. The column headed $N_d$ in the table refers to the index of refraction of the lens element bounded on the left by the indicated surface at the wavelength of the sodium d spectral line (i.e., 0.58756 micron). The column headed $V_d$ refers to the Abbe number for the lens element bounded on the left by that surface. The index of refraction of an optical material varies with wavelength. The indices of refraction for the two different materials comprising the solid and liquid lens elements of the lens system indicated, at five representative wavelengths (i.e., $N_1$ at 0.29673 micron, $N_2$ at 0.28045 micron, $N_3$ at 0.31257 micron, $N_4$ at 0.25365 micron, $N_5$ at 0.40466 micron) are tabulated as follows:

TABLE 10

| Material | $N_1$ | $N_2$ | $N_3$ | $N_4$ | $N_5$ |
| --- | --- | --- | --- | --- | --- |
| Sapphire | 1.815969 | 1.824203 | 1.809266 | 1.840217 | 1.785820 |
| Perfluoromethyldecalin | 1.331447 | 1.333914 | 1.329458 | 1.339214 | 1.322434 |

The lens system of the embodiment indicated has been evaluated above for each of the above-specified wavelengths. In particular, a graphical indication of performance of the lens system at the particular wavelengths has been provided by a plot of optical path difference as a function of normalized aperture height for the specified wavelength. As shown above, plots of optical path difference as a function of normalized aperture height are shown for the indicated lens system for each of the same five wavelengths for which indices of refraction are tabulated. It can be determined from the curves plotted that the maximum optical path difference for the lens system shown throughout the selected range of wavelengths is less than 0.027 waves at any point on the aperture. Further shown above, the root-mean-square (rms) wavefront error of the lens system shown has been plotted throughout a selected portion of the ultraviolet spectrum. According to the information shown, the lens system is well corrected throughout the selected range of the ultraviolet spectrum.

Sixth Embodiment

FIG. 16 shows a profile drawing of another embodiment of the present invention, which comprises a lens arrangement 58 including first and second solid lens elements 60 and 61 respectively, each of which is made of fused silica. The fused silica lens elements can be obtained from, e.g., Heraeus Amersil, Inc. of Duluth, Ga. Lens arrangement 58 includes a fixture 65 in which are coaxially mounted lens elements 60 and 61 with a flexible material 65', such as fluorosilicone for example, along a common optic axis. Lens arrangement 58 further includes a liquid element 66 contained within fixture 65. The liquid element according to the present embodiment is perfluoromethyldecalin. Perfluoromethyldecalin is identified by the code designation "312.02."

FIG. 17 is a plot of the optical path difference versus the normalized aperture height for five selected wavelengths, showing that the maximum wavefront error for any one of the plotted wavelengths is less than 0.069 wavelengths for the embodiment of FIG. 16. FIG. 18 is a plot of rms wavefront error for the embodiment of FIG. 16, versus wavelength for an ultraviolet wavelength range from 0.25 to 0.45 microns. As indicated, for the embodiment of FIG. 16, the rms wavefront error is less than 0.021 wave, and the average rms wavefront error is 0.0071 wave, over the range from 0.250 to 0.450 micron.

The lens arrangement shown in FIG. 16 has an optical prescription (i.e., a design form) specified in tabular form as follows:

TABLE 11

| Surface No. | Radius (inches) | Thickness (inches) | $N_d$ | $V_d$ | Material |
|---|---|---|---|---|---|
| 1 | 0.758642 | 0.014334 | 1.458464 | 67.82 | Fused Silica |
| 2 | 0.255769 | 0.014996 | 1.317242 | 102.26 | 312.02 |
| 3 | −0.169568 | 0.014334 | 1.458464 | 67.82 | Fused Silica |
| 4 | −0.259326 | 1.002001 | | | Air | where the surfaces of the lens elements are numbered consecutively from left to right along the optic axis in accordance with optical design convention. Thus, surface No. 1 is the left surface of the first solid lens element. Surface No. 2 is both the right surface of the first solid element and the left surface of the liquid lens element. Surface No. 3 is both the right surface of the liquid lens element and the left surface of the second solid lens element. The aperture stop is at surface No. 1. The radius listed for each lens surface in the table above is the radius of curvature expressed in inches. In accordance with convention, the radius of curvature is positive if the center of curvature of the surface lies to the right of the surface, and negative if the center of curvature of the surface lies to the left of the surface. The thickness listed for each lens surface is the thickness expressed in inches of the lens element bounded on the left by the surface. The thickness of each lens element is measured along the optic axis. The column headed $N_d$ in the table refers to the index of refraction of the lens element bounded on the left by the indicated surface at the wavelength of the sodium d spectral line (i.e., 0.58756 micron). The column headed $V_d$ refers to the Abbe number for the lens element bounded on the left by that surface. The index of refraction of an optical material varies with wavelength. The indices of refraction for the two different materials comprising the solid and liquid lens elements of the lens system indicated, at five representative wavelengths (i.e., $N_1$ at 0.25365 micron, $N_2$ at 0.28045 micron, $N_3$ at 0.29673 micron, $N_4$ at 0.31257 micron, $N_5$ at 0.40466 micron) are tabulated as follows:

TABLE 12

| Material | $N_1$ | $N_2$ | $N_3$ | $N_4$ | $N_5$ |
|---|---|---|---|---|---|
| Fused Silica | 1.505514 | 1.494039 | 1.488733 | 1.484489 | 1.469616 |
| Perfluoromethyl-decalin | 1.339214 | 1.333914 | 1.331447 | 1.329458 | 1.322434 |

The lens system of the embodiment indicated has been evaluated above for each of the above-specified wavelengths. In particular, a graphical indication of performance of the lens system at the particular wavelengths has been provided by a plot of optical path difference as a function of normalized aperture height for the specified wavelength. As shown above, plots of optical path difference as a function of normalized aperture height are shown for the indicated lens system for each of the same five wavelengths for which indices of refraction are tabulated. It can be determined from the curves plotted that the maximum optical path difference for the lens system shown throughout the selected range of wavelengths is less than 0.069 waves at any point on the aperture. Further shown above, the root-mean-square (rms) wavefront error of the lens system shown has been plotted throughout a selected portion of the ultraviolet spectrum. According to the information shown, the lens system is well corrected throughout the selected range of the ultraviolet spectrum.

The present invention has been described above in terms of certain exemplary embodiments. However, practitioners skilled in the art of optical design, after having perused the foregoing description and the accompanying drawing, could readily develop design forms for other embodiments without departing from the scope of the present invention. Therefore, the present invention is defined more generally by the following claims and their equivalents.

What is claimed is:

1. A lens system comprising a first rigid lens element, a second rigid lens element, and a liquid lens element, said liquid lens element being contained between said first and second rigid lens elements, said first and second rigid lens elements and said liquid lens element co-acting with each other to cause said lens system to have an RMS wavefront error of less than 0.2 over a continuous ultraviolet wavelength band up to 0.4 micron, wherein said first and second rigid lens elements are each made of a solid material having ultraviolet transparency, and said liquid lens element is made of a liquid having ultraviolet transparency.

2. The lens system according to claim 1 wherein said liquid lens element is made of carbon tetrachloride, and said first and second rigid lens elements are made of a material selected from a group consisting of sapphire and fused silica.

3. A lens system comprising a first rigid lens element, a second rigid lens element and a liquid lens element, said liquid lens element being contained between said first and second lens elements, said first and second rigid lens elements and said liquid lens elements co-acting with each other to cause said lens system to have substantially diffraction limited performance over a continuous ultraviolet wavelength band, wherein said first and second rigid lens elements are made of a solid material having ultraviolet transparency and wherein said liquid lens element is made of a liquid having ultraviolet transparency; wherein said first and second rigid lens elements and said liquid lens element are configured and positioned with respect to each other according to a design form specified as follows:

| Surface No. | Radius (inches) | Thickness (inches) | $N_d$ | $V_d$ | Material |
|---|---|---|---|---|---|
| 1 | −0.491657 | 0.014161 | 1.768239 | 72.01 | Sapphire |
| 2 | −0.518232 | 0.004889 | 1.459453 | 48.75 | 459487 |
| 3 | 1.639807 | 0.014161 | 1.768239 | 72.01 | Sapphire |
| 4 | −0.447569 | 1.018384 | | | Air | where the surfaces of the optic elements are numbered consecutively from left to right along the optic axis, and where $N_d$ is the index of refraction at the wavelength of the sodium d spectral line and $V_d$ is the Abbe number at the same wavelength.

4. A lens system comprising a first rigid lens element, a second rigid lens element and a liquid lens element, said liquid lens element being contained between said first and second lens elements, said first and second rigid lens elements and said liquid lens elements co-acting with each other to cause said lens system to have substantially diffraction limited performance over a continuous ultraviolet wavelength band, wherein said first and second rigid lens elements are made of a solid material having ultraviolet transparency and wherein said liquid lens element is made of a liquid having ultraviolet transparency; wherein said first and second rigid lens elements and said liquid lens element are configured and positioned with respect to each other according to a design form specified as follows:

| Surface No. | Radius (inches) | Thickness (inches) | $N_d$ | $V_d$ | Material |
|---|---|---|---|---|---|
| 1 | −17.260861 | 0.014335 | 1.458464 | 67.82 | Fused Silica |
| 2 | −0.120206 | 0.004854 | 1.459453 | 48.75 | 459487 |
| 3 | −0.173948 | 0.014335 | 1.458464 | 67.82 | Fused Silica |
| 4 | −0.454856 | 1.002262 | | | Air | where the surfaces of the optic elements are numbered consecutively from left to right along the optic axis, and where $N_d$ is the index of refraction at the wavelength of the sodium d spectral line and $V_d$ is the Abbe number at the same wavelength.

5. The lens system according to claim 1 wherein said liquid lens element is made of hexane, and said first and second rigid lens elements are made of a material selected from a group consisting of sapphire and fused silica.

6. A lens system comprising a first rigid lens element, a second rigid lens element and a liquid lens element, said liquid lens element being contained between said first and second lens elements, said first and second rigid lens elements and said liquid lens elements co-acting with each other to cause said lens system to have substantially diffraction limited performance over a continuous ultraviolet wavelength band, wherein said first and second rigid lens elements are made of a solid material having ultraviolet transparency and wherein said liquid lens element is made of a liquid having ultraviolet transparency; wherein said first and second rigid lens elements and said liquid lens element are configured and positioned with respect to each other according to a design form specified as follows:

| Surface No. | Radius (inches) | Thickness (inches) | $N_d$ | $V_d$ | Material |
|---|---|---|---|---|---|
| 1 | −0.322243 | 0.014136 | 1.768239 | 72.01 | Sapphire |
| 2 | −0.247875 | 0.004881 | 1.375217 | 58.03 | 375580 |
| 3 | 0.444671 | 0.014136 | 1.768239 | 72.01 | Sapphire |
| 4 | −0.917975 | 1.015422 | | | Air | where the surfaces of the optic elements are numbered consecutively from left to right along the optic axis, and where $N_d$ is the index of refraction at the wavelength of the sodium d spectral line and $V_d$ is the Abbe number at the same wavelength.

7. A lens system comprising a first rigid lens element, a second rigid lens element and a liquid lens element, said liquid lens element being contained between said first and second lens elements, said first and second rigid lens elements and said liquid lens elements co-acting with each other to cause said lens system to have substantially diffraction limited performance over a continuous ultraviolet wavelength band, wherein said first and second rigid lens elements are made of a solid material having ultraviolet transparency and wherein said liquid lens element is made of a liquid having ultraviolet transparency; wherein said first and second rigid lens elements and said liquid lens element are configured and positioned with respect to each other according to a design form specified as follows:

| Surface No. | Radius (inches) | Thickness (inches) | $N_d$ | $V_d$ | Material |
|---|---|---|---|---|---|
| 1 | 1.990923 | 0.014317 | 1.458464 | 67.82 | Fused Silica |
| 2 | −0.282854 | 0.004848 | 1.375217 | 58.03 | 375580 |
| 3 | 0.224832 | 0.014317 | 1.458464 | 67.82 | Fused Silica |
| 4 | −4.677900 | 0.982100 | | | Air | where the surfaces of the optic elements are numbered consecutively from left to right along the optic axis, and where $N_d$ is the index of refraction at the wavelength of the sodium d spectral line and $V_d$ is the Abbe number at the same wavelength.

8. The lens system according to claim 1 wherein said liquid lens element is made of perfluoromethyldecalin, and said first and second rigid lens elements are made of a material selected from a group consisting of sapphire and fused silica.

9. A lens system comprising a first rigid lens element, a second rigid lens element and a liquid lens element, said liquid lens element being contained between said first and second lens elements, said first and second rigid lens elements and said liquid lens elements co-acting with each other to cause said lens system to have substantially diffraction limited performance over a continuous Ultraviolet wavelength band, wherein said first and second rigid lens elements are made of a solid material having ultraviolet transparency and wherein said liquid lens element is made of a liquid having ultraviolet transparency; wherein said first and second rigid lens elements and said liquid lens element are configured and positioned with respect to each other according to a design form specified as follows:

| Surface No. | Radius (inches) | Thickness (inches) | $N_d$ | $V_d$ | Material |
|---|---|---|---|---|---|
| 1 | 0.446790 | 0.014162 | 1.768239 | 72.01 | Sapphire |
| 2 | 0.193834 | 0.017500 | 1.317242 | 102.26 | 312.02 |
| 3 | −0.129698 | 0.014162 | 1.768239 | 72.01 | Sapphire |
| 4 | −0.156752 | 1.027437 | | | Air | where the surfaces of the optic elements are numbered consecutively from left to right along the optic axis, and where $N_d$ is the index of refraction at the wavelength of the sodium d spectral line and $V_d$ is the Abbe number at the same wavelength.

10. A lens system comprising a first rigid lens element, a second rigid lens element and a liquid lens element, said liquid lens element being contained between said first and second lens elements, said first and second rigid lens elements and said liquid lens elements co-acting with each other to cause said lens system to have substantially diffraction limited performance over a continuous ultraviolet wavelength band, wherein said first and second rigid lens elements are made of a solid material having ultraviolet transparency and wherein said liquid lens element is made of a liquid having ultraviolet transparency; wherein said first and second rigid lens elements and said liquid lens element are configured and positioned with respect to each other according to a design form specified as follows:

| Surface No. | Radius (inches) | Thickness (inches) | $N_d$ | $V_d$ | Material |
|---|---|---|---|---|---|
| 1 | 0.758642 | 0.014334 | 1.458464 | 67.82 | Fused Silica |
| 2 | 0.255769 | 0.014996 | 1.317242 | 102.26 | 312.02 |

-continued

| Surface No. | Radius (inches) | Thickness (inches) | $N_d$ | $V_d$ | Material |
|---|---|---|---|---|---|
| 3 | −0.169568 | 0.014334 | 1.458464 | 67.82 | Fused Silica |
| 4 | −0.259326 | 1.002001 | | | Air | where the surfaces of the optic elements are numbered consecutively from left to right along the optic axis, and where $N_d$ is the index of refraction at the wavelength of the sodium d spectral line and $V_d$ is the Abbe number at the same wavelength.

* * * * *